United States Patent
Takeguchi et al.

(10) Patent No.: US 7,830,655 B2
(45) Date of Patent: Nov. 9, 2010

(54) ELECTRONIC DEVICE

(75) Inventors: Koichiro Takeguchi, Tokyo (JP); Shigeo Hayashi, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 12/437,431

(22) Filed: May 7, 2009

(65) Prior Publication Data

US 2010/0073861 A1 Mar. 25, 2010

(30) Foreign Application Priority Data

Sep. 22, 2008 (JP) .............................. 2008-243201

(51) Int. Cl.
*G06F 1/16* (2006.01)
*H05K 5/00* (2006.01)
*H05K 7/00* (2006.01)

(52) U.S. Cl. .............................. 361/679.33; 361/679.55

(58) Field of Classification Search ............ 361/679.02, 361/679.09, 679.31, 679.33, 679.55, 679.56
See application file for complete search history.

(56) References Cited

U.S. PATENT DOCUMENTS

| | | | | |
|---|---|---|---|---|
| 5,455,746 A * | 10/1995 | Sato et al. | ............... | 361/679.55 |
| 6,780,030 B2 | 8/2004 | Yoshinaga et al. | | |
| 6,914,777 B2 * | 7/2005 | Hsu | ...................... | 361/679.56 |
| 7,458,511 B2 | 12/2008 | Takimoto | | |
| 7,499,282 B1 * | 3/2009 | Loucks | ........................ | 361/730 |
| 2004/0100761 A1 * | 5/2004 | Liu | ............................. | 361/685 |
| 2005/0213249 A1 | 9/2005 | Shimomura | | |
| 2005/0243507 A1 * | 11/2005 | Lambert et al. | ............. | 361/685 |
| 2006/0002061 A1 * | 1/2006 | Hua | ........................... | 361/680 |
| 2006/0002065 A1 * | 1/2006 | Hua | ........................... | 361/683 |
| 2006/0002077 A1 * | 1/2006 | Carlson et al. | ............. | 361/685 |
| 2006/0098396 A1 * | 5/2006 | Shih | ........................... | 361/679 |
| 2006/0134940 A1 * | 6/2006 | Motoe | ......................... | 439/64 |

(Continued)

FOREIGN PATENT DOCUMENTS

JP  H06-075661 A  3/1994

(Continued)

OTHER PUBLICATIONS

Explanation of Non-English Language Reference(s).

(Continued)

*Primary Examiner*—Jayprakash N Gandhi
*Assistant Examiner*—Adrian S Wilson
(74) *Attorney, Agent, or Firm*—Knobbe, Martens Olson & Bear LLP (57) ABSTRACT

According to one embodiment, an electronic device includes a chassis, a housing, a communication unit, and a holder. The chassis includes a conductive portion. The housing, in the chassis, has structure to hold a first storage device. The housing is configured to house the first storage device or a second storage device that requires structure to hold it to be conductive. The communication unit is configured to be located between the chassis and the first or second storage device. The communication unit includes a communication module and a case made of a nonconductive material to ensure the wireless communication function of the communication module. The holder made of a conductive material is provided to the case to hold the second storage device in the housing. The holder includes a fixing portion to fix the second storage device and a conducting portion electrically connectable to the conductive portion.

4 Claims, 7 Drawing Sheets

U.S. PATENT DOCUMENTS

| | | | |
|---|---|---|---|
| 2006/0258289 A1* | 11/2006 | Dua | 455/41.3 |
| 2007/0008691 A1* | 1/2007 | Kim | 361/683 |
| 2007/0146988 A1* | 6/2007 | Yamagishi et al. | 361/687 |
| 2008/0137281 A1* | 6/2008 | Chen et al. | 361/685 |
| 2008/0225494 A1* | 9/2008 | Yang | 361/727 |
| 2009/0009939 A1* | 1/2009 | Nakajima et al. | 361/683 |

FOREIGN PATENT DOCUMENTS

| | | |
|---|---|---|
| JP | 2000-039934 A | 2/2000 |
| JP | 2001-092564 | 4/2001 |
| JP | 2004-055988 | 2/2004 |
| JP | 2005-284335 | 10/2005 |
| JP | 2006-107341 | 4/2006 |
| JP | 2006-172371 A | 6/2006 |
| JP | 2009-151525 | 7/2009 |

OTHER PUBLICATIONS

Notice of Allowance for the Japanese patent application No. 2008-243201 mailed by Japan Patent Office on Sep. 15, 2009.

* cited by examiner

ELECTRONIC DEVICE

CROSS-REFERENCE TO RELATED APPLICATIONS

This application is based upon and claims the benefit of priority from Japanese Patent Application No. 2008-243201, filed Sep. 22, 2008, the entire contents of which are incorporated herein by reference.

BACKGROUND

1. Field

One embodiment of the invention relates to an electronic device.

2. Description of the Related Art

An electronic device such as a portable notebook computer (hereinafter, "notebook PC") is generally provided with a housing having a hard disk drive (HDD) mounted therein. Reference may be had to, for example, Japanese Patent Application Publication (KOKAI) No. 2006-172371.

In recent years, NAND flash memory has been developed that is based on the same connection interface standard (ATA standard) as HDD. Such NAND flash memory is also referred to as a solid state drive (SDD). Compared to HDD, SDD offers higher performance in data reading with increased shock resistance and less power consumption.

Besides, recent notebook PCs often include a communication unit having a transmission/reception antenna used for wireless communication with a contactless IC card.

In the case of build to order (BTO) where a product is built in response to a customer order, either HDD or SDD may be exclusively mounted on the product.

The housing for mounting HDD and that for SDD are different in their internal structure, even if they resemble in appearance, because of the difference in the form and strength of the structures to hold HDD and SDD as well as the difference in their electrical characteristics. In terms of strength, HDD is heavier than SDD and needs a stronger holding structure. Besides, HDD is more susceptible to vibrations and shocks, and therefore, when mounted on a notebook PC which is supposed to be carried around, HDD is likely to be fixed to the housing via a buffer such as rubber instead of being directly fixed thereto. In terms of electrical characteristics, HDD is enclosed in a metal case, and therefore is electrically connected to GND (frame ground) through the metal case with a conductive gasket or a metal spring. On the other hand, an SDD module (a modular SDD not in a case) is in a form of a printed circuit board (PCB) without being enclosed in a case. Therefore, the SDD module itself needs to be electrically connected with screws to GND (frame ground).

For these reasons, a notebook PC needs a dedicated housing depending on whether to use HDD or SDD due to the difference in the form and strength of the structures to hold HDD and SDD and in electrical characteristics as described above. The provision of a common housing without specific countermeasures results in an increase in the thickness of notebook PCs against the tendency to make notebook PCs even thinner.

Further, if a notebook PC is mounted with a communication unit used for wireless communication with a contactless IC card, a component to hold the communication unit needs to be made of a nonconductive material such as plastic so that it does not adversely affect the communication performance. In addition, it is necessary to leave a sufficient space (area) for the transmission/reception antenna.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic device comprises a chassis, a housing, a communication unit, and a holder. The chassis comprises a conductive portion. The housing is provided in the chassis, and comprises a structure to hold a first storage device. The housing is configured to house either the first storage device or a second storage device. The second storage device occupies an area smaller than an area occupied by the first storage device, and requires the structure to hold it to be conductive. The communication unit is configured to be located between the chassis and either the first storage device or the second storage device. The communication unit comprises a communication module that performs wireless communication and a case that is made of a nonconductive material to ensure the communication function of the communication module. The holder is configured to be provided to the case of the communication unit to hold the second storage device when the second storage device is housed in the housing. The holder is made of a conductive material, and comprises a fixing portion located outside the case to fix the second storage device and a conducting portion located to be electrically connectable to the conductive portion of the chassis.

With reference to FIGS. 1 to 12, a description will be given of an electronic device according to an embodiment of the invention. The electronic device is described below as a notebook PC.

Figure 1:
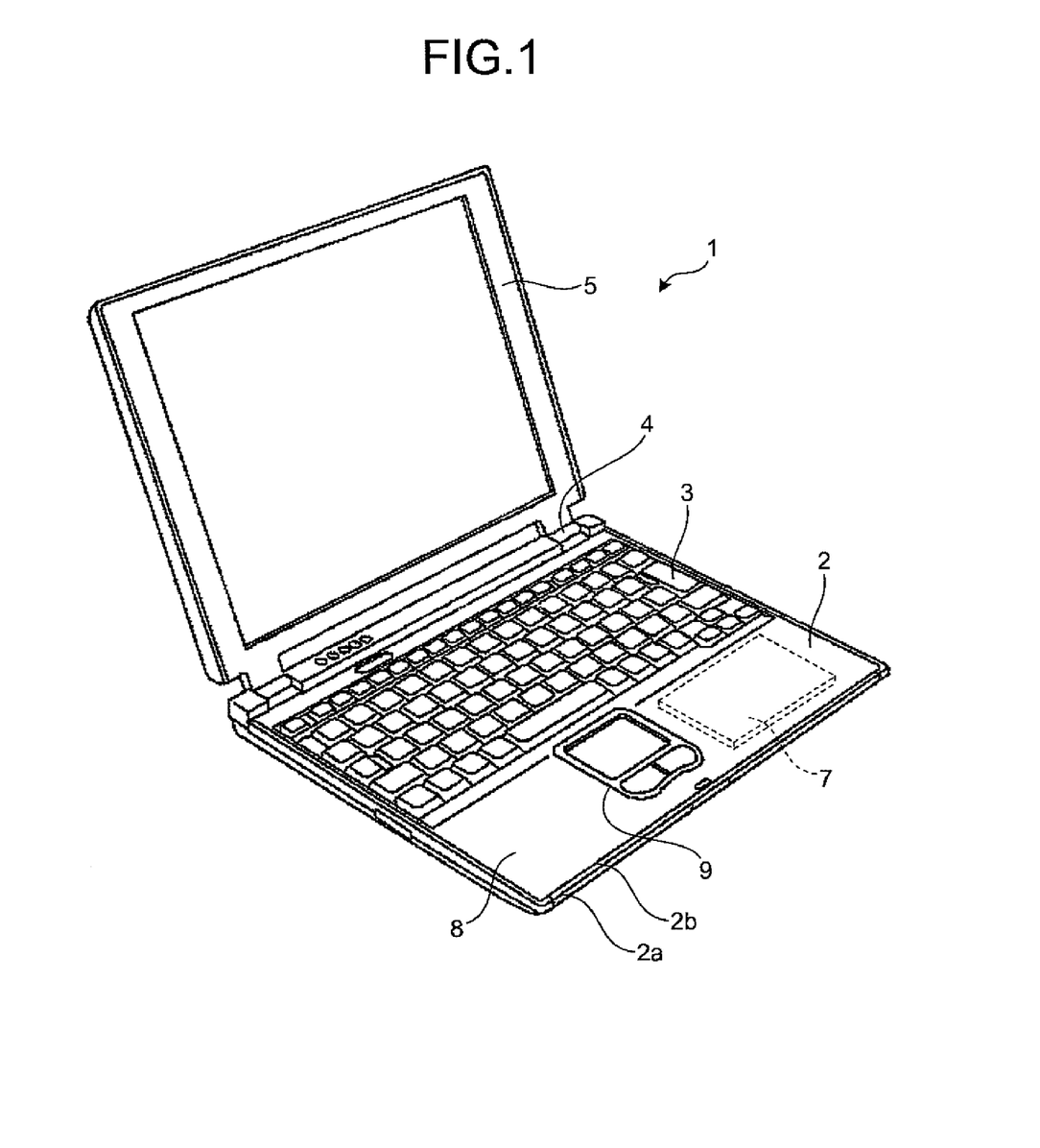
FIG. 1 is an exemplary perspective view of a notebook PC according to an embodiment of the invention.
Figure 2:
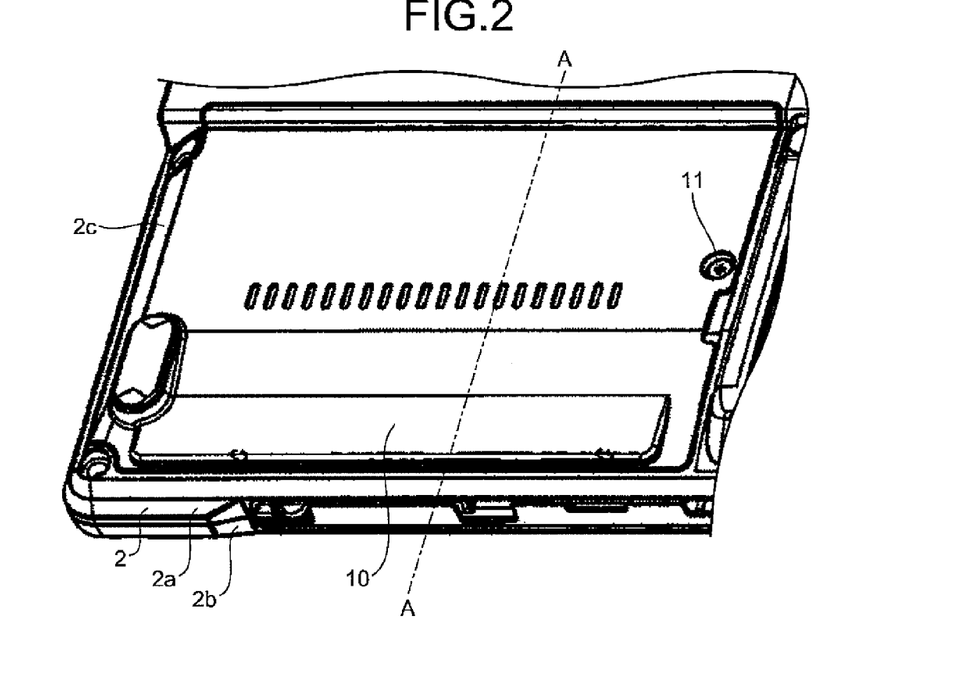
FIG. 2 is an exemplary perspective view of the back of the notebook PC in the embodiment.
Figure 3:
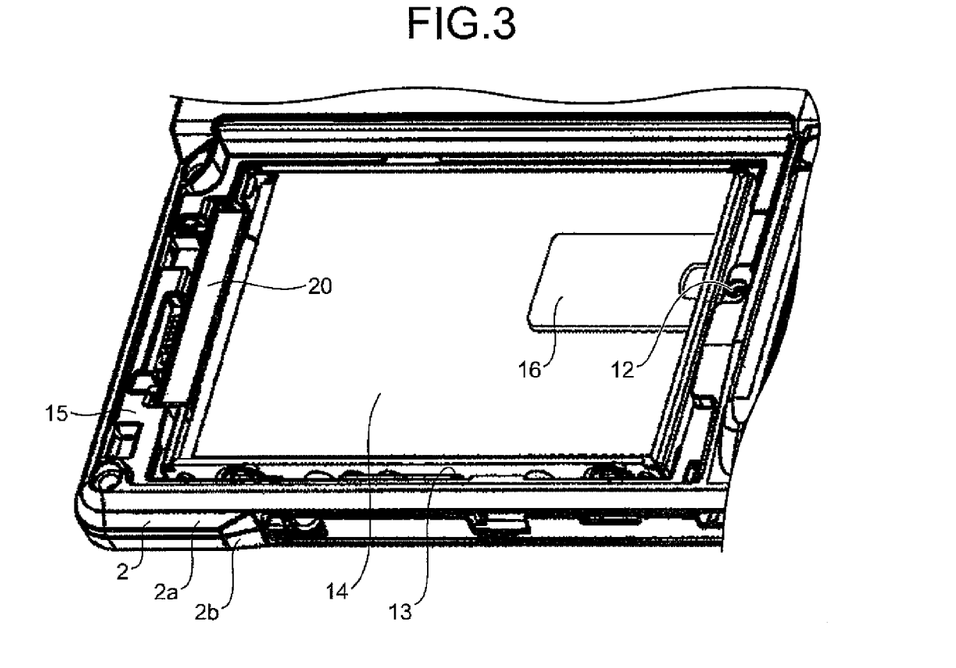
FIG. 3 is an exemplary perspective view of a storage device housing without its cover in the embodiment.
Figure 4:
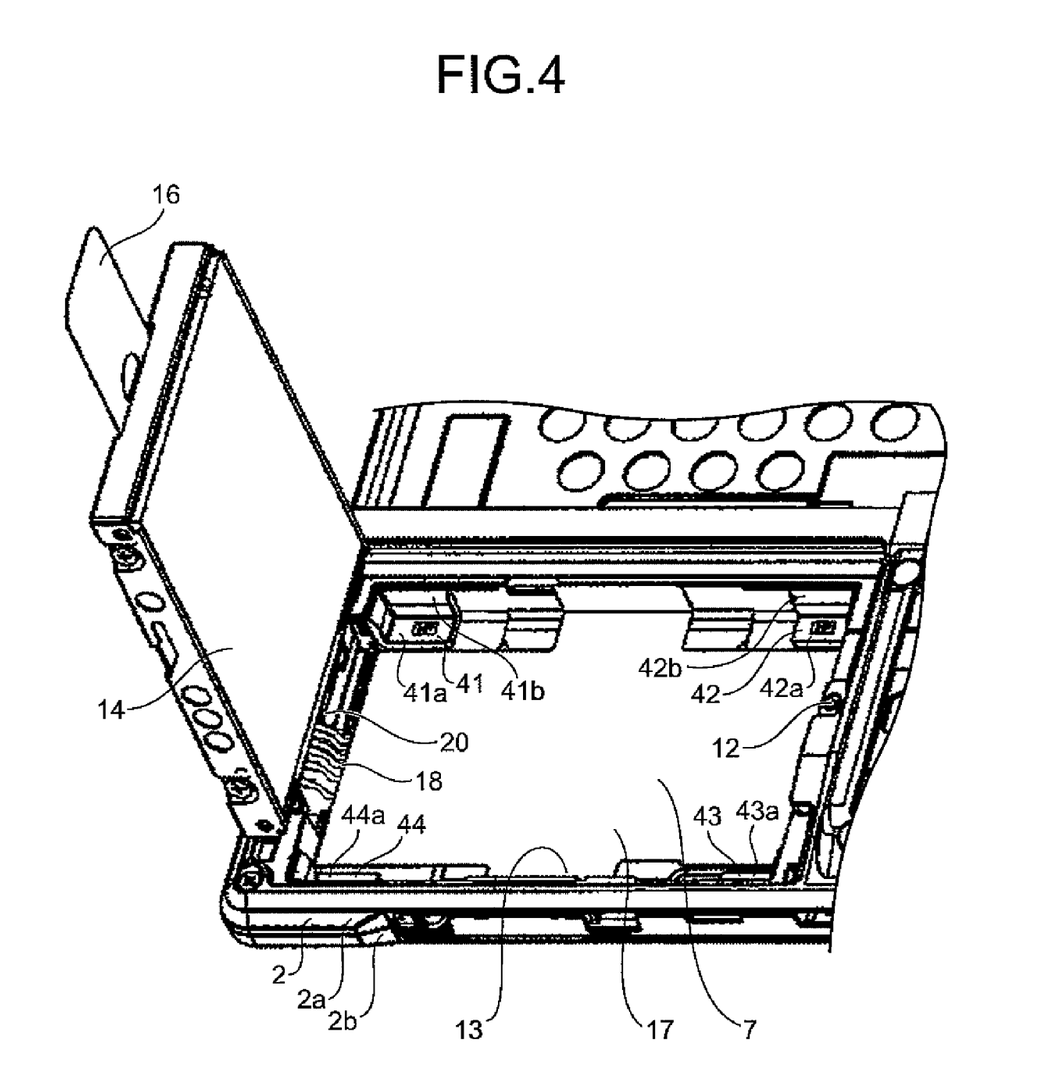
FIG. 4 is an exemplary perspective view of the storage device housing in which HDD stands in the embodiment.

FIG. 1 is a perspective view of a notebook PC 1. FIG. 2 is a perspective view of the back of the notebook PC 1. FIG. 3 is a perspective view of a storage device housing 13 without a cover 10. FIG. 4 is a perspective view of the storage device housing 13 in which an HDD 14 stands. As illustrated in FIG. 1, the notebook PC 1 comprises a chassis 2, a keyboard on the chassis 2, and a display module 5 rotatably connected to the chassis 2 via a hinge 4. The chassis 2 comprises a lower case 2a and an upper case 2b. A palm rest 8 is formed on the front side of the upper surface of the upper case 2b. A touchpad 9 is provided in substantially the center of the palm rest 8.

As illustrated in FIGS. 2 and 3, the storage device housing 13, which will be described later, is provided to a bottom surface 2c of the chassis 2 at a position corresponding to the palm rest 8. The storage device housing 13 is covered by the cover 10. The cover 10 is fixed to the chassis 2 with a screw 11.

As illustrated in FIG. 3, either the HDD 14 or an SSD 6 (see FIG. 11) is selectably and removably housed in the storage device housing 13. The HDD 14 serves as the first storage device, while the SSD 6 serves as the second storage device. The SSD 6 is a NAND flash memory based on the same connection interface standard (ATA standard) as the HDD 14. In the example of FIG. 3, the HDD 14 is housed in the storage device housing 13.

The storage device housing 13 is formed integral with the lower case 2a. Between the storage device housing 13 and the lower case 2a of the chassis 2 is provided a cover bearing portion 15 on which the cover 10 is supported. The cover bearing portion 15 is recessed from the bottom surface 2c. In the cover bearing portion 15 is formed a screw hole 12 into which the screw 11 is screwed. The HDD 14 is provided with an assist handle 16 that facilitates the removal of the HDD 14. The assist handle 16 is made of an insulating material such as plastic. The storage device housing 13 is provided with a connector 20 such that the HDD 14 or the SSD 6 housed in the storage device housing 13 is connected to the connector 20.

Incidentally, the cover 10 is provided with elastic buffers 10a on the side of the HDD 14 (see FIG. 7) to reduce the shock to the HDD 14 in the storage device housing 13.

A description will be given of how the HDD 14 is mounted.

For example, as illustrated in FIG. 4, when the assist handle 16 on the HDD 14 is pulled, the connector 20 rotates. Accordingly, the HDD 14 stands up with respect to the storage device housing 13. The HDD 14 is removed from the connector 20 while in this standing state.

The storage device housing 13 is provided with elastic buffers 41, 42, 43, and 44 to absorb shocks to the HDD 14. The buffers 41 to 44 are made of rubber, and are arranged on the bottom surface of the storage device housing 13 such that they correspond to the four corners of the bottom surface of the HDD 14, respectively, when the HDD 14 is housed in the storage device housing 13. The buffers 41 to 44 each have an L-like shaped cross-section. The buffers 41, 42, 43, and 44 have bottom portions 41a, 42a, 43a, and 44a, respectively. The buffers 41 and 42 further have side portions 41b and 42b, respectively (although not illustrated, the buffers 43 and 44 also have side portions, respectively). The bottom portions 41a to 44a are configured to be in contact with the bottom surface of the HDD 14, while the side portions 41b and 42b as well as the side portions of the buffers 43 and 44 (not illustrated) are configured to be in contact with the sides of the HDD 14.

The connector 20 is connected via a cable 18 to a control board (not illustrated) inside the main body. The cable 18 is covered over with a sheet 17 made of an insulating material.

In addition, as illustrated in FIGS. 1 to 4, the notebook PC 1 of the embodiment is provided with a communication unit 7 inside the storage device housing 13. The communication unit 7 performs contactless or wireless communication with a contactless IC card based on a standard for short-range contactless data transfer referred to as near field communication (NFC).

Figure 5:
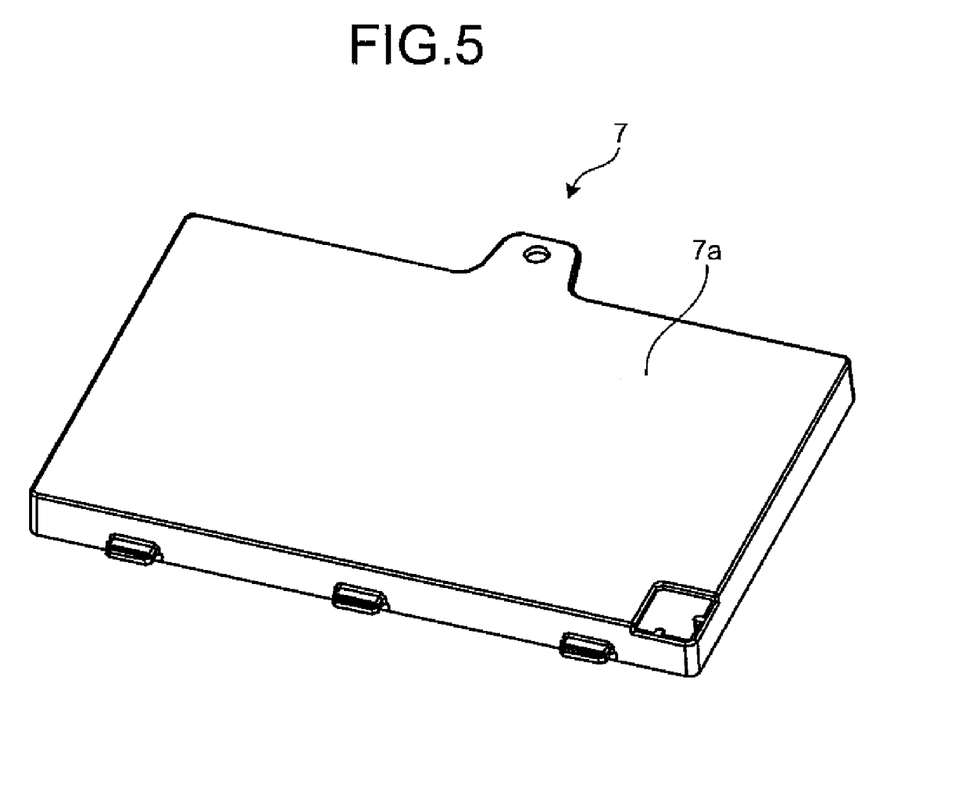
FIG. 5 is an exemplary perspective view of a communication unit in the embodiment.
Figure 6:
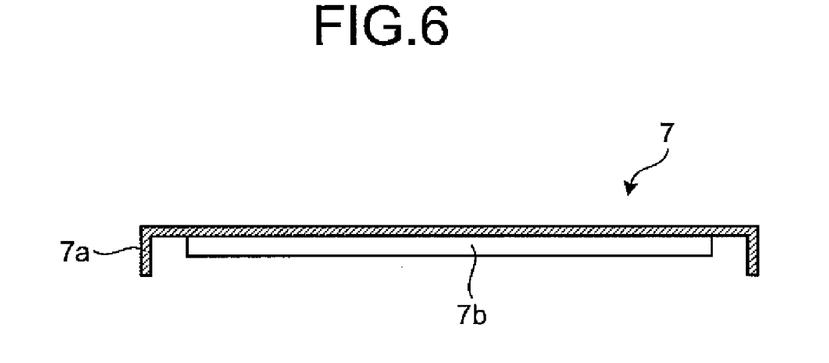
FIG. 6 is an exemplary cross-sectional view of the communication unit in the embodiment.

FIG. 5 is a perspective view of the communication unit 7. FIG. 6 is a cross-sectional view of the communication unit 7 illustrated in FIG. 5. The communication unit 7 comprises a case 7a and a communication module 7b. The case 7a has a flat rectangular box-like shape having an opening on the side of the palm rest 8. The communication module 7b includes a transmission/reception antenna and is housed in the case 7a. The area occupied by the case 7a is smaller than that occupied by the HDD 14. The case 7a is made of a nonconductive material such as plastic. The case 7a, which is made of a nonconductive material (plastic, etc.) as just described, does not adversely affect the communication function of the communication module 7b housed therein.

Figure 7:
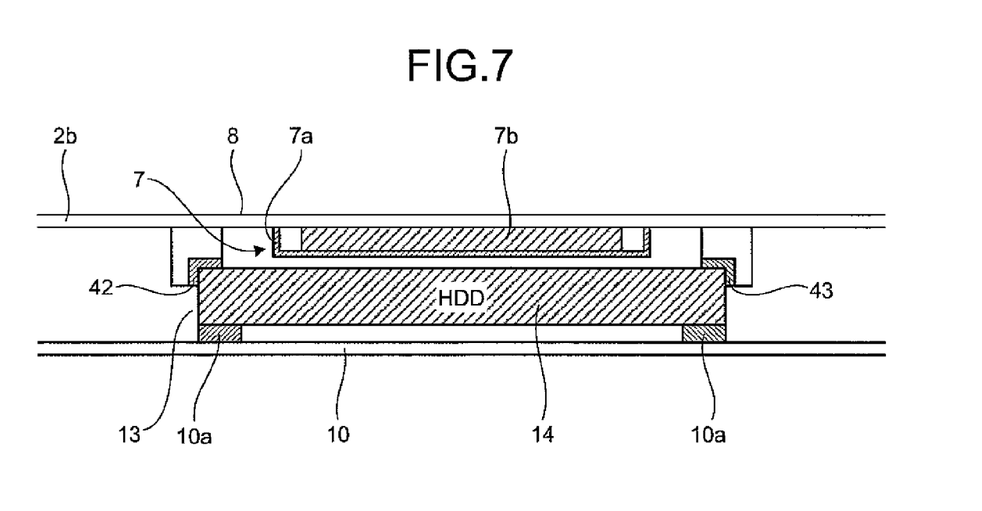
FIG. 7 is an exemplary cross-sectional view taken along the line A-A of FIG. 2 in the embodiment.

FIG. 7 is a cross-sectional view taken along the line A-A of FIG. 2. As illustrated in FIG. 7, the communication unit 7 is located between the chassis 2 (the upper case 2b) and the HDD 14 housed in the storage device housing 13. In other words, the communication unit 7 is located closer to the chassis 2 (the upper case 2b) than the buffers 41 to 44 arranged inside the storage device housing 13. With this, the communication unit 7 and the HDD 14 can be placed one on top of the other in the storage device housing 13.

As described above, the communication unit 7 occupies an area smaller than that occupied by the HDD 14, and is located closer to the chassis 2 (the upper case 2b) than the buffers 41 to 44 arranged inside the storage device housing 13. Thus, the structure (the buffers 41 to 44) to hold the HDD 14 can be directly formed on the side of the chassis 2 (the upper case 2b).

A description will then be given of how the SSD 6 is mounted instead of the HDD 14.

As illustrated in FIG. 7, the communication unit 7 is located between the chassis 2 (the upper case 2b) and the HDD 14 housed in the storage device housing 13. In other words, the communication unit 7 is located closer to the chassis 2 (the upper case 2b) than the structure (the buffers 41 to 44) to hold the HDD 14. The area occupied by the SSD 6 is smaller than that occupied by the HDD 14 and is substantially equal to that occupied by the communication unit 7. Therefore, the structure to hold the SSD 6 cannot be directly formed on the side of the chassis 2 (the upper case 2b). One approach to this may be to provide the structure to hold the SSD 6 on the case 7a of the communication unit 7. In this case, however, a problem arises because the case 7a of the communication unit 7 needs to be nonconductive not to adversely affect the communication function of the communication module 7b, while the structure to hold the SSD 6 needs to be conductive so that the SSD 6 can be electrically connected to GND.

Figure 8:
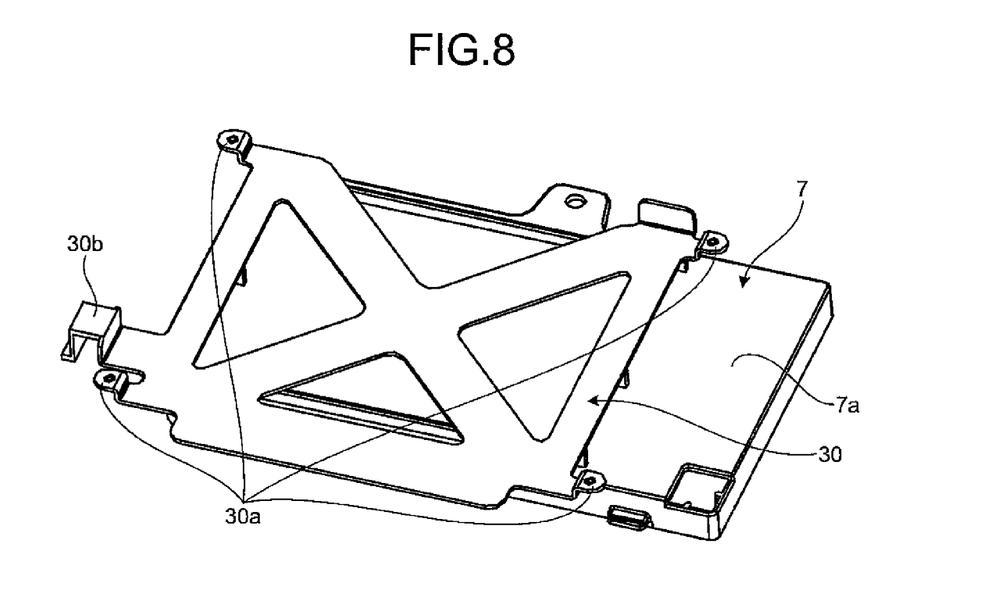
FIG. 8 is an exemplary perspective view of the communication unit with an SSD holder in the embodiment.
Figure 9:
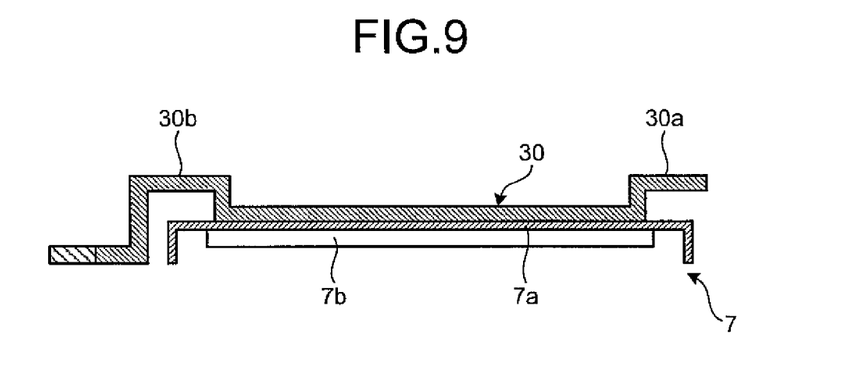
FIG. 9 is an exemplary cross-sectional view of the communication unit with the SSD holder in the embodiment.

To solve the problem, according to the embodiment, an SSD holder 30 is provided to the case 7a of the communication unit 7 when the SSD 6 is mounted in the storage device housing 13 as illustrated in FIGS. 8 and 9. The SSD holder 30 is a component to hold the SSD 6, and is made of a conductive material such as metal. The SSD holder 30 is formed in a plate-like shape, and is attached to the case 7a with, for example, adhesive or double-sided tape.

Figure 11:
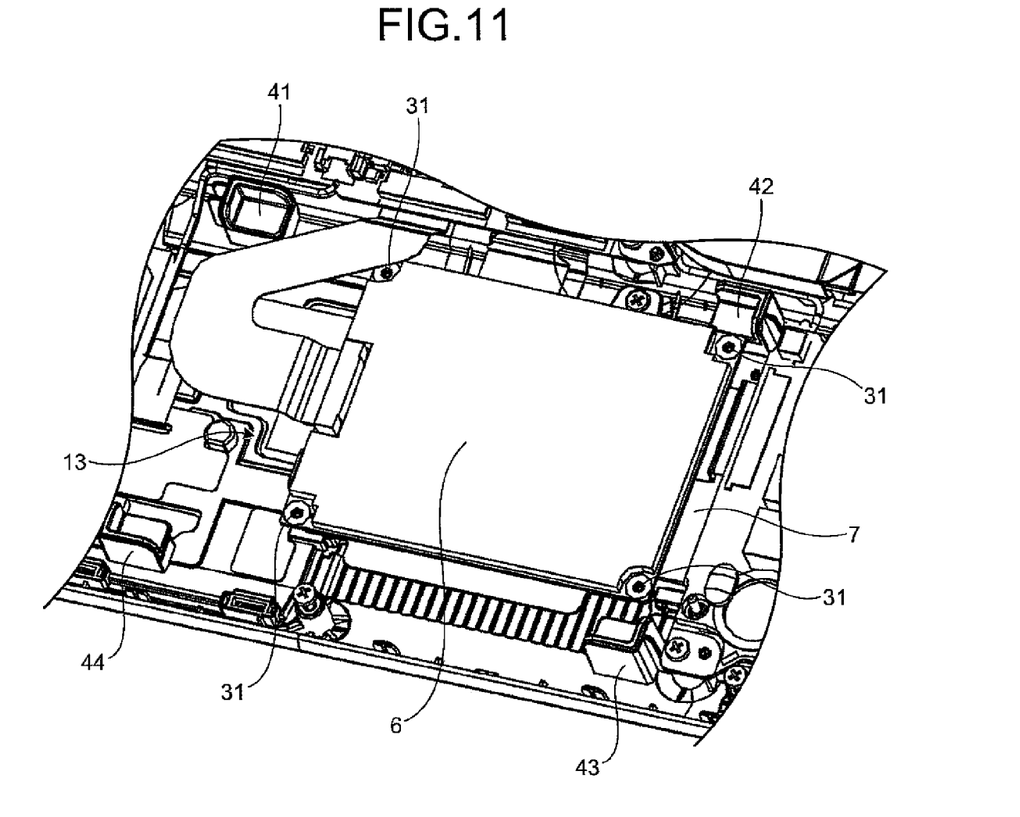
FIG. 11 is an exemplary perspective view of the storage device housing having the SDD mounted therein in the embodiment.

As illustrated in FIG. 8, the SSD holder 30 comprises fixing portions 30a through which the SSD 6 is fixed thereto with screws 31 (see FIG. 11). The fixing portions 30a are formed such that they extend outside the area of the case 7a. Since the fixing portions 30a extend outside the area of the case 7a in this manner, the SSD holder 30 can be prevented from adversely affecting the communication function of the communication module 7b.

The SSD holder 30 further comprises a conducting portion 30b that is located to be capable of establishing an electrical ground connection to a conductive portion 32 applied to the chassis 2.

Figure 10:
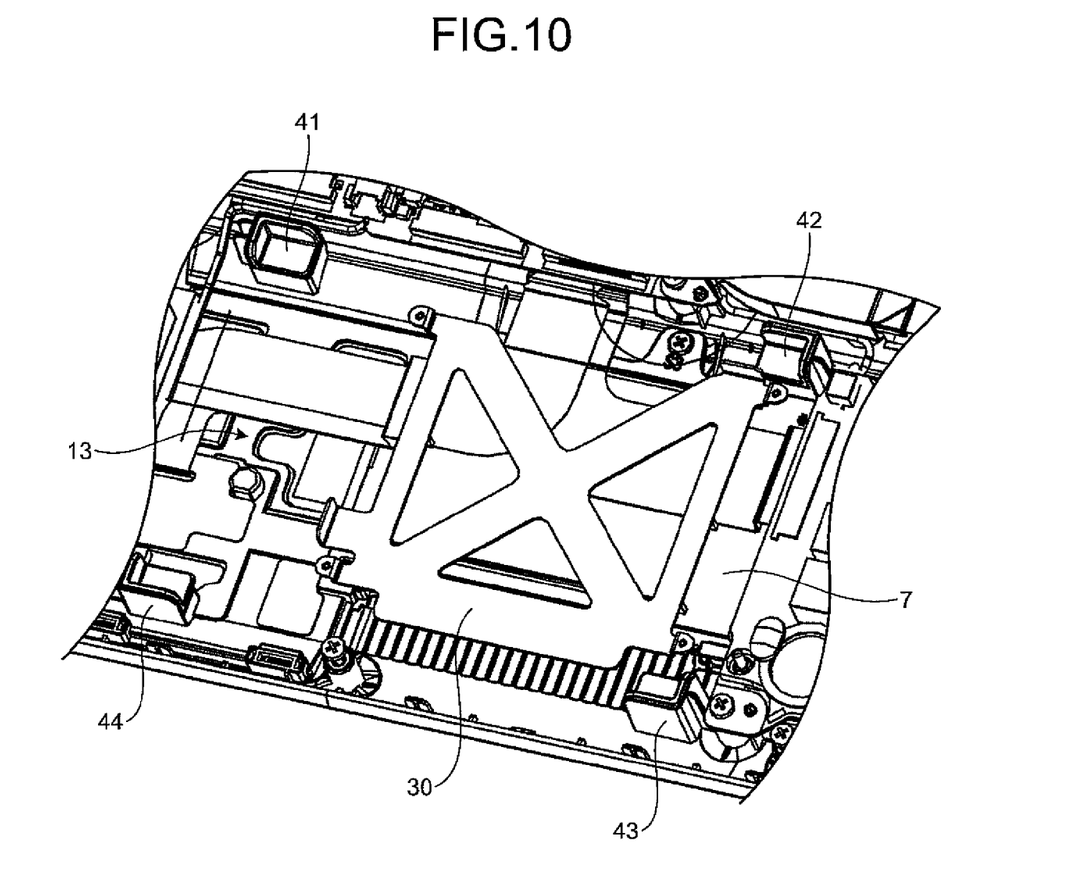
FIG. 10 is an exemplary perspective view of the storage device housing before an SDD is mounted therein in the embodiment.
Figure 12:
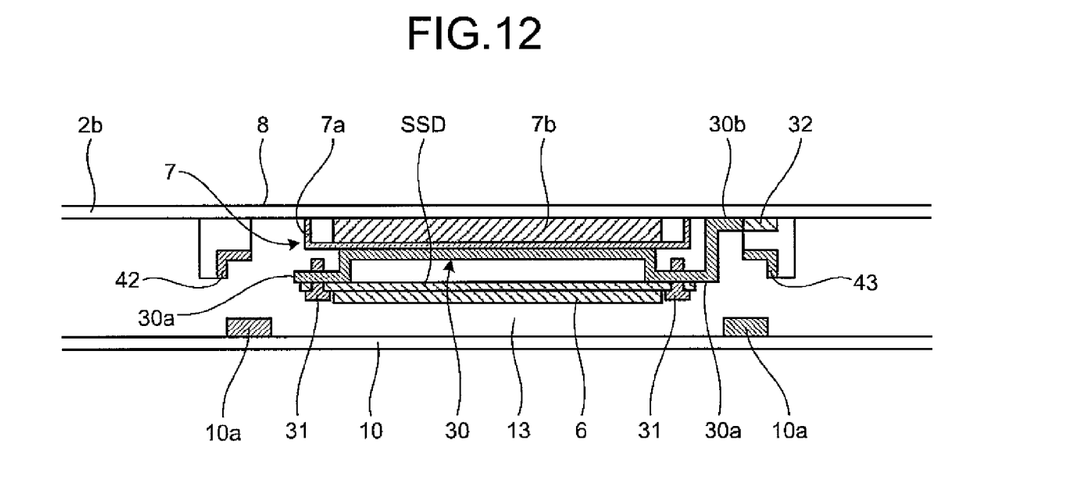
FIG. 12 is an exemplary cross-sectional view of the storage device housing having the SDD mounted therein in the embodiment.

FIG. 10 is a perspective view of the storage device housing 13 before the SDD 6 is mounted therein. FIG. 11 is a perspective view of the storage device housing 13 having the SDD 6 mounted therein. FIG. 12 is a cross-sectional view of the storage device housing 13 illustrated in FIG. 11. As illustrated in FIGS. 10 to 12, the SSD holder 30, which does not adversely affect the communication function of the communication module 7b, is provided to the communication unit 7 mounted on the chassis 2 (the upper case 2b), and the SDD 6 is attached to the SSD holder 30. With this, both the HDD 14 and the SDD 6 can be mounted in the same chassis 2. Besides, as illustrated in FIG. 12, the conducting portion 30b of the SSD holder 30 makes an electrical ground connection to the conductive portion 32 applied to the chassis 2. Thus, the SSD 6 can be electrically connected to the GND through the SSD holder 30.

As described above, according to the embodiment, to house the SSD 6, which occupies a small area compared to the HDD 14 and needs a conductive structure to hold it, in the storage device housing 13 having a structure capable of holding the HDD 14, the SSD holder 30 for holding the SSD 6 is provided to the case 7a of the communication unit 7 located between the chassis 2 and the SSD 6. The case 7a is made of a nonconductive material to ensure the communication function of the communication module 7b. The SSD holder 30 is made of a conductive material, and comprises the fixing portions 30a and the conducting portion 30b. The fixing portions 30a are located outside the area of the case 7a, and are used to fix the SSD 6 to the SSD holder 30. The conducting portion 30b is located to be electrically connectable to the conductive portion 32 of the chassis 2. This ensures the physical strength of the structure to hold the HDD 14 as well as the conduction of the structure to hold the SSD 6 without adversely affecting the communication function of the communication unit 7. Thus, each of the different types of storage devices (the HDD 14 and the SSD 6) can be mounted together with the communication unit 7 one on top of the other while appropriate structures are provided to hold the different storage devices, respectively. That is, the same chassis can satisfy the physical and electrical conditions for mounting different types of storage devices (the HDD 14 and the SSD 6), respectively, with the communication unit 7.

While the electronic device of the embodiment is described above as a portable notebook computer, this is by way of example and not by way of limitation, as other types of electronic devices may be possible. Namely, the electronic device of the embodiment may be the one with a housing capable of housing HDD, such as a personal digital assistant (PDA), a mobile terminal, and an electronic organizer.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
    a chassis with a conductive portion;
    a housing in the chassis, the housing comprising a structure configured to hold a first storage device and configured to house either the first storage device or the second storage device configured to occupy an area smaller than an area occupied by the first storage device, the structure configured to house the second storage is configured to be conductive;
    a communication module configured to be located between the chassis and either the first storage device or the second storage device, the communication module comprising:
        a communication module configured to wirelessly communicate; and
        a case made of a nonconductive material in order to ensure wireless communication function of the wireless communication module; and
    a holder configured to be provided to the case of the communication module configured to hold the second storage device when the second storage device is in the housing, the holder made of a conductive material comprising:
        an attaching portion outside the case configured to attach the second storage device to the case; and
        a conducting portion located to be electrically connectable to the conductive portion of the chassis.

2. The electronic device of claim 1, wherein the first storage device is a hard disk drive.

3. The electronic device of claim 1, wherein the second storage device is a solid state drive.

4. The electronic device of claim 1, wherein the communication module is configured to wirelessly communicate based on a near field communication standard for wireless communication with a contactless integrated circuit device.

* * * * *